No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 1.

Fig. 1.

Witnesses
Inventor
Jean Gohy
Attorneys

No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 4.

Witnesses
H. M. Kuehne
[signature]

Inventor
Jean Gohy
by [signature]
Attorneys

No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 5.

Witnesses
H. M. Kuehne
[signature]

Inventor
Jean Gohy
by Richard
Attorneys

No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 6.

Witnesses

Inventor
Jean Gohy
by Richardson
Attorneys

No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 7.

Witnesses
H. M. Kuehne
[signature]

Inventor
Jean Gohy
by [signature]
Attorneys

No. 729,572. PATENTED JUNE 2, 1903.
J. GOHY.
HEDDLE MAKING MACHINE.
APPLICATION FILED SEPT. 26, 1902.

NO MODEL. 9 SHEETS—SHEET 8.

Witnesses
H. M. Kuhne
Otto Munk

Inventor
Jean Gohy
by Richardson
Attorneys

THE NORRIS PETERS CO., PHOTO-LITHO., WASHINGTON, D. C.

No. 729,572. PATENTED JUNE 2, 1903.
J. GOHY.
HEDDLE MAKING MACHINE.
APPLICATION FILED SEPT. 26, 1902.
NO MODEL. 9 SHEETS—SHEET 9.

Witnesses
H. M. Kuehn
O...

Inventor
Jean Gohy
by Richardson
Attorneys

No. 729,572. Patented June 2, 1903.

UNITED STATES PATENT OFFICE.

JEAN GOHY, OF ENSIVAL, NEAR VERVIERS, BELGIUM.

HEDDLE-MAKING MACHINE.

SPECIFICATION forming part of Letters Patent No. 729,572, dated June 2, 1903.

Application filed September 26, 1902. Serial No. 124,993. (No model.)

*To all whom it may concern:*

Be it known that I, JEAN GOHY, manufacturer, a subject of the King of Belgium, residing at Ensival, near Verviers, in the Kingdom of Belgium, have invented certain new and useful Improvements in Heald-Making Machines, of which the following is a specification.

My invention relates to a machine for the manufacture of loom-healds of the kind formed by two wires soldered together, and has for its purpose to obtain a perfect heald absolutely free from any roughness which would injure the warp-threads of the loom, the ends of the double wire being with that object in view and after having formed the ends, loops, or eyes forced open, so as to form supplementary loops or eyes adapted to receive the bent-over ends of the wire having formed the end loops.

A further object of my invention is to considerably increase the production of the machine compared with that of machines as hitherto constructed, this result being attained by aid of a special feeding device and of several details of construction, as will be fully pointed out in the following description.

Referring to the annexed drawings, Fig. 7 is a vertical section on the line C D of Fig. 1 and showing the knife which serves to cut the wire to the required length after it has been brought in front of the machine by the gripper represented in Figs. 4 and 5. Fig. 10$^a$ is a view similar to Fig. 10, showing the said hook at the moment it begins the bending back of the wire. Fig. 10$^b$ is also a view similar to Fig. 10, showing the hook at the moment that the end of the wire has been bent back. Fig. 11$^a$ is a view similar to Fig. 11, showing two levers adapted the one to bring the wire in the position it must occupy in order to be subjected to the action of the hook mechanism shown in Fig. 10 and the other to deliver the heald out of the machine after the heald is finished. Figs. 11$^b$ and 11$^c$ are two front views of the said levers, showing their action on the heald. Fig. 13$^a$ is a vertical section on the line O P of Fig. 13, showing certain details of the mechanism in Fig. 13. Fig. 13$^b$ is an enlarged view of a detail of the mechanism shown in Fig. 13. Figs. 17 to 21 are designed to illustrate the different stages of the work effected by the machine.

Figure 1:
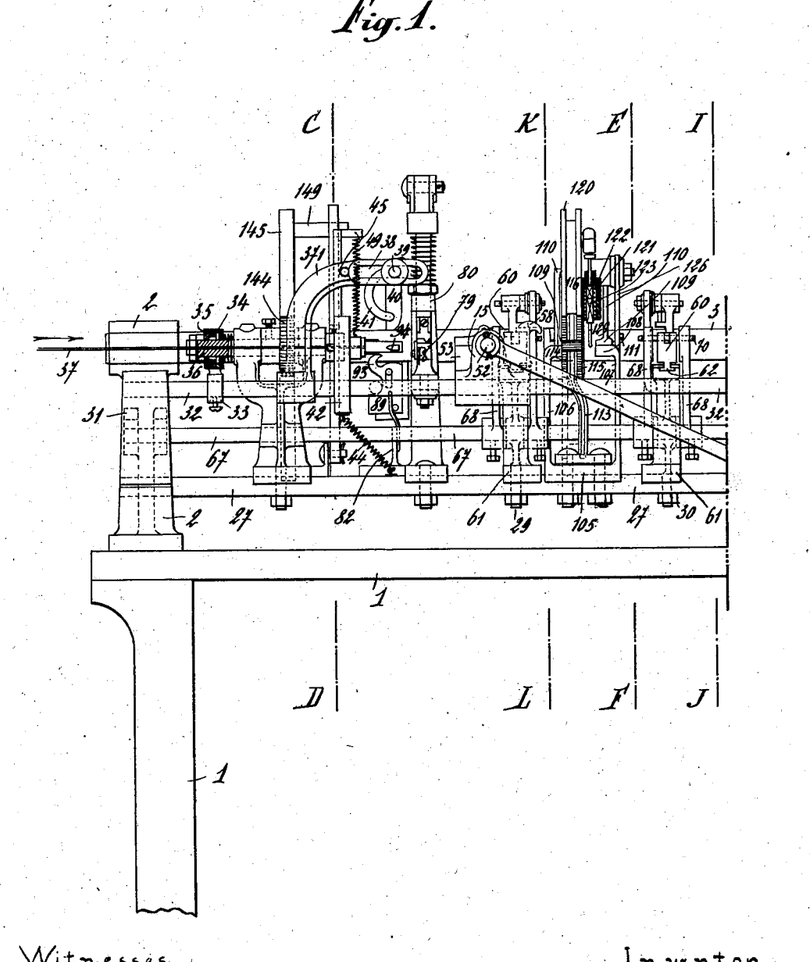
Figures 1 and 2 show a front elevation of the complete machine.
Figure 2:
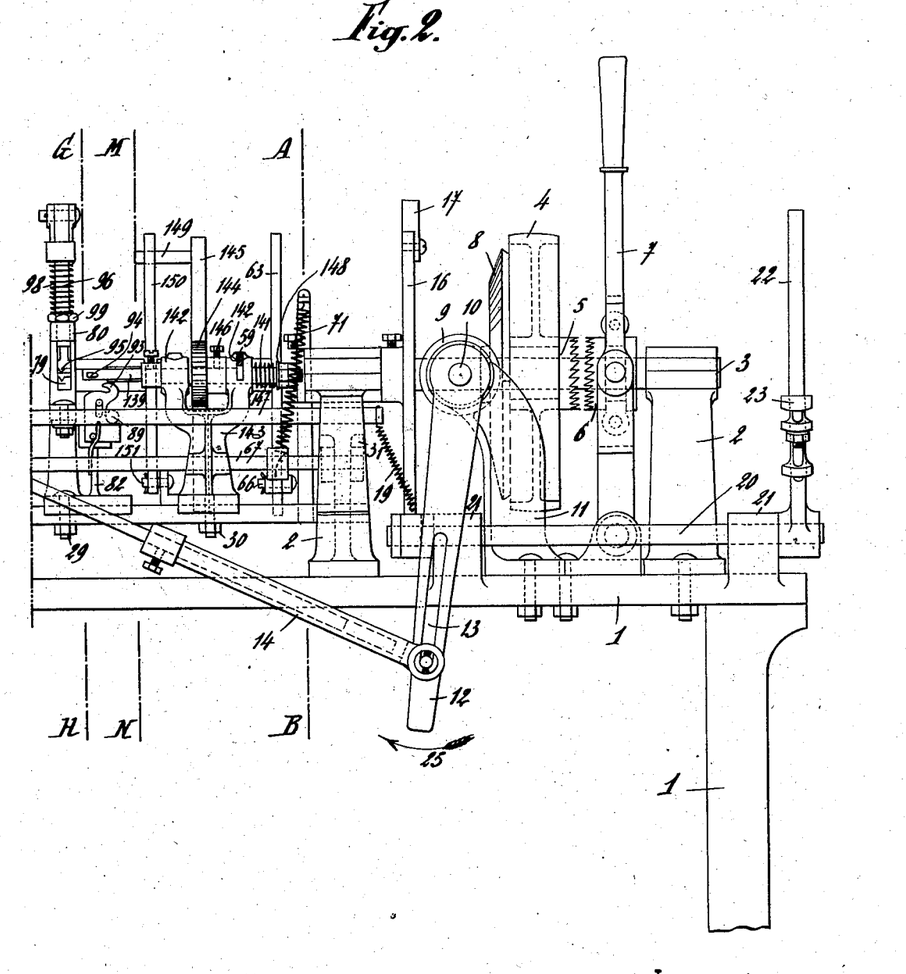
Figure 3:
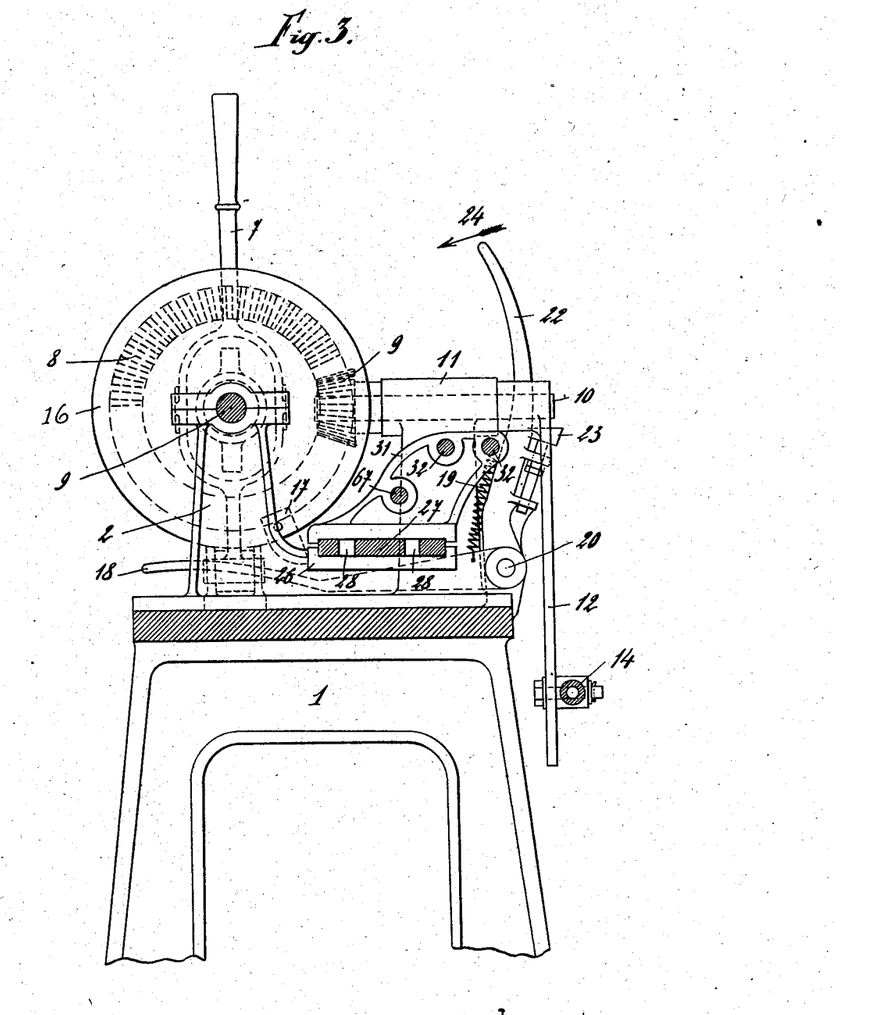
Fig. 3 is a vertical section taken on the line A B of Fig. 2, the said figure showing the devices situated at the driven side of the machine.

As shown in Figs. 1 and 2, upon a frame 1 are mounted three brackets 2 or a larger number, if required. In these brackets is passed the driving-shaft 3 of the machine. This shaft carries the different disks or wheels and cams designed to actuate the different devices of the machine and receives motion from a pulley 4, turning loose upon the said shaft and provided with a half-clutch 5, with which can be coupled a second half-clutch 6, sliding upon the shaft 3, but participating in its rotation. This half-clutch 6 can be engaged with the half-clutch 5 through the medium of a forked lever 7. At the side of the pulley 4 is mounted upon the shaft 3 a bevel gear-wheel 8, provided with teeth upon only a portion of its circumference, so as to cause at each revolution a single rotation of a bevel-pinion 9, mounted upon a small transverse shaft 10, carried in a bracket 11, fixed on the frame 1. The shaft 10 carries at its end a crank 12, provided with a slot 13 and actuating a telescopic rod 14, connected to the wire gripper or receiver 15, which will be hereinafter described. Upon the shaft 3 is also mounted a disk 16, carrying a cam 17, adapted to act at each revolution of the shaft 3 upon a lever 18, Fig. 3, subjected to the action of a spring 19 and keyed at the end of a small shaft 20, turning in bearings 21 and carrying outside a vertical arm 22, provided with an adjustable stop 23. This stop 23 serves as a rest or support for the crank 12 during the time that the pinion 9 is out of engagement with the toothed part of the bevel gear-wheel 8. Directly the teeth of the gear-wheel 8, consequent upon the rotation of the shaft 3, become engaged with the pinion 9 the cam 17, suitably mounted for this purpose upon the disk 16 with regard to the teeth of the gear-wheel 8, encounters the lever 18 and slightly lowers it, thus causing a sufficient retraction of the stop 23 in the direction of the arrow 24, Fig. 3, to allow the crank 12 to pass in front of the stop 23 and effect a complete rotation in the direction of the arrow 25, Fig. 2. During this rotation the telescopic or extensible rod 14 communicates a to-and-fro movement to the wire gripper or holder 15 and allows it to proceed to secure the wire at the opposite end of the machine and to bring it in front of the latter. After the crank 12 has completed its rotation under the action of the toothed part of the gear-wheel 8 it comes back into its former position and is horizontal and parallel with the shaft 3 upon the adjustable stop 23, where it remains at rest until the moment when the toothed part of the gear-wheel 8 again comes into gear with the pinion 9.

Figure 6:
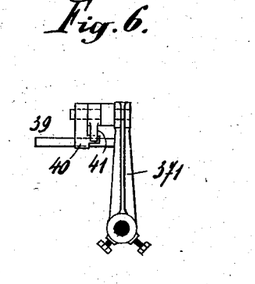
Fig. 6 is an elevation of a lever designed to cause the gripping device to open to allow it to seize the wire as it enters the machine.

The brackets 2 are provided with extensions 26, (see Fig. 3,) supporting a table 27, provided with slots 28, in which can be fixed at variable distances apart by means of bolts 29, Fig. 1, and nuts 30 the different branches or supports carrying the tools or devices for working upon the heald. Upon this table 27 are first mounted, by preference above the extensions 26 of the brackets 2, two or more brackets 31, Figs. 1, 2, and 3, carrying two parallel rods 32, Figs. 1, 2, and 3, extending the whole length of the machine between the said brackets 31. These rods serve as guides for the wire-holder 15, already mentioned. Upon the said guide-rods 32 is mounted at the opposite end to the driving mechanism of the machine a bracket 33, forming a cup 34, Fig. 1, in which can be introduced and held by a screw-cover 35 a washer provided with a piece of india-rubber or other elastic material 36, made with a hole, through which passes the wire 37 as it enters the machine. This elastic piece 36 (which can turn freely upon its axis with the washer carrying it according to the twist formed by the wire in unwinding) exerts a certain friction upon the wire 37 in proportion as it is introduced into the machine and drawn to the front by the wire gripper or holder 15, as will be hereinafter described. This arrangement has for object to prevent any formation of kinks in the wire as it unwinds and to straighten it by the friction that the piece 36 exerts upon it in proportion to its advance. At the side of the bracket 33 is mounted upon the guide-rods 32 an arm 371. (Represented in edge view at Fig. 6.) This arm 371 carries in a guide-slot 38, Fig. 1, a small shaft 39, upon which can freely oscillate in one direction a stop 40, the oscillation of which in the opposite direction is prevented by a fixed stop 41. As will be hereinafter explained more in detail, the said stop 40 is designed to cause the opening of the nipper of the wire-holder 15 at the moment when the latter is about to seize the wire to bring it in front of the machine.

At the side of the arm 371 and nearer the wire-holder 15 is mounted upon the guide-rods 32 a plate 42, provided with a small hole 43, Fig. 7, in which the wire 37 is introduced after it has passed into the elastic piece 36. The plate 42 can slide freely upon the rods 32, so that it can be brought near to the arm 371, but is subjected to the action of a spring 44, Fig. 1, which keeps it normally pressed against a stop 45, fixed on the arm 371. This plate 42 carries a rocking lever 46, Fig. 7, one end of which can pivot upon a pin 47 and the other end of which bears against a cam 48, fixed on the shaft 3 of the machine. This lever 46 is subjected to the action of a spring 49, which keeps it pressed against the cam. It is made in the form of a knife at the part where the hole 43 is situated, which gives passage to the wire, so that upon the lowering of the said knife under the action of the cam 48 the wire 37 will be cut close to the plate 42.

Figure 4:
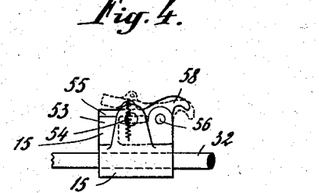
Fig. 4 is a detached view in elevation of the gripping device for bringing the wire to the front of the machine.
Figure 5:
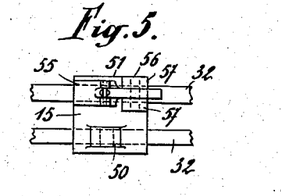
Fig. 5 is a plan of the said device.
Figure 11:
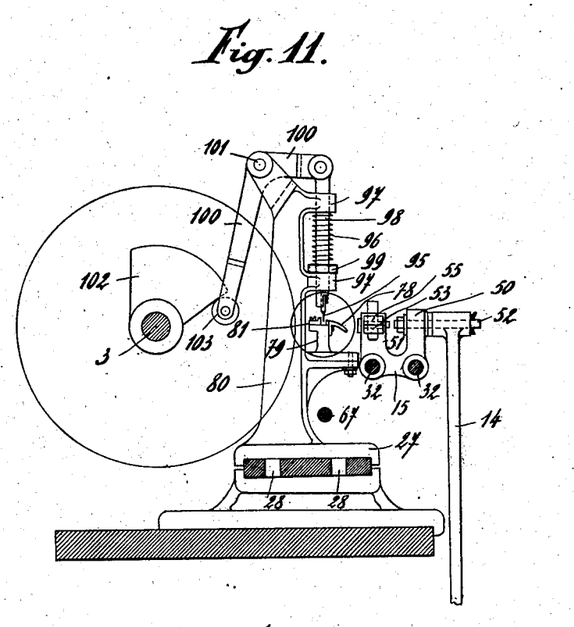
Fig. 11 is a vertical section on the line I J of Fig. 1, the said figure showing separately the mechanism serving to form the supplementary eyes or loops and to bend down into the said eyes the ends of the wire after the latter have been folded back by the hook mechanism illustrated in Figs. 9 and 10.
Figure 11A:
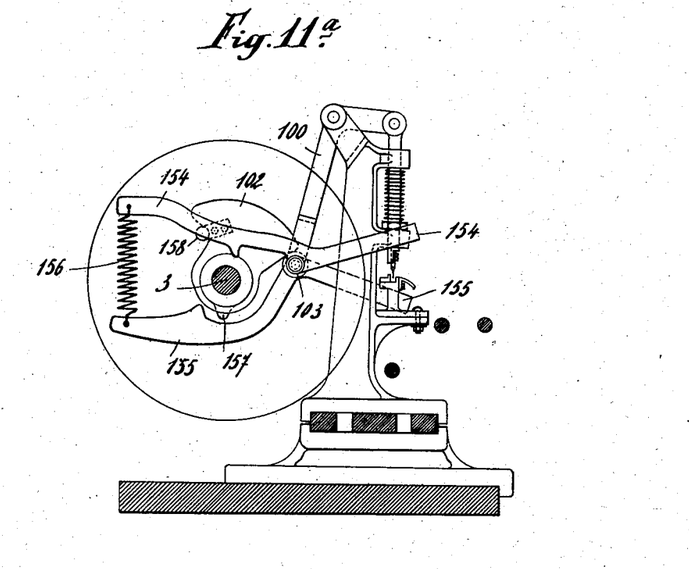

The wire-holder 15, actuated by the telescopic rod 14 and receiving from the latter a to-and-fro movement upon the guide-rods 32, is represented separately in Figs. 4 and 5. It is formed, as shown in the said figures, of a small carriage 15, having two vertical arms or branches 50 51. (See, for example, also Fig. 11.) To the branch 50 is connected the telescopic rod 14 by means of a pivot 52, Figs. 1 and 11. The branch 51 forms a jaw 53, Figs. 4 and 11, on which is applied under the action of a spring 54 a movable jaw 55, pivoted at 56, Fig. 4, between two lugs 57 on the branch 51. The movable jaw 55 is provided at its opposite end with a nose 58, curved back and directed downward.

The three devices hereinbefore described—viz., the wire-guide 36, stop 40, and knife 46—work conjointly with the wire-holder 15 in the following manner: When the crank 12 rests upon the stop 23, as already described, the wire-holder 15 is at the end of its forward travel—that is to say, at the greatest distance that it can occupy with relation to the knife-carrying plate 42. When the cam 17 by its action upon the lever 18 moves the stop 23 from its ordinary position, the gear-wheel 8 rotates the crank 12. The wire-holder 15 then commences its backward travel and moves over the guide-rods 32 and approaches the knife-carrying plate 42. The wire 37, which has been introduced into the wire-guide 36 and into the hole 43 of the plate 42, is flush with the said plate by reason of the previous cutting operation. The wire-holder 15 having completed its backward travel abuts against the knife-carrying plate 42 and causes the latter to slightly move back over the guide-rods 32 against the action of the spring 44, so that the end of the wire 37 may slightly project beyond the surface of the plate 42 in order to be seized between the jaws 53 and 55 of the wire-holder 15. The latter can seize the wire, because in approaching the knife-carrying plate 42 the backwardly-curved part 58 of the movable jaw 55 has encountered the stop 40, carried by the arm 371, and this stop, held back by the stop 41, has consequently compelled the curved part 58 to be lowered and the jaw 55 to be lifted into the dotted position represented in Fig. 4. When the end of the wire projecting from the plate 42 becomes engaged between the jaws, the gripper 15 has completed its backward travel and the curved part 58 of the jaw 55 has passed beyond the stop 40. The jaw 55 consequently falls back onto the fixed jaw 53, nipping the wire between the two jaws under the action of the spring 54. The crank 12 having by this time performed a half-revolution, the wire-gripper 15 commences its forward travel and moves away from the knife-carrying plate 42 and carries along the wire, which becomes straightened by its passage through the wire-guide 36. As the wire-gripper 15 moves away the knife-carrying plate 42 is brought back into its normal position under the action of the spring 44. During its forward travel the gripper 15 can again free the stop 40 without, however, being influenced by the latter, seeing that the stop can freely move in this direction, and is lifted on the passage of the gripper 15 by the curved nose 58 of the jaw 55. This jaw consequently remains closed, and the wire is conducted in front of the machine until the moment when the gripper 15, having completed its forward travel; the crank 12 again bears upon the stop 23, while the toothed part of the gear-wheel 8 is out of engagement with the pinion 9. At this moment the cam 48, Fig. 7, comes against the lever 46 and causes the latter to effect the cutting of a length of wire. The wire ought, however, previously to be held in suitable nippers designed to bring it into the machine directly after the cutting operation and the opening of the movable jaw 55 of the gripper by its coming in contact with a suitable stop 59, Fig. 2, have taken place.

Figure 8:
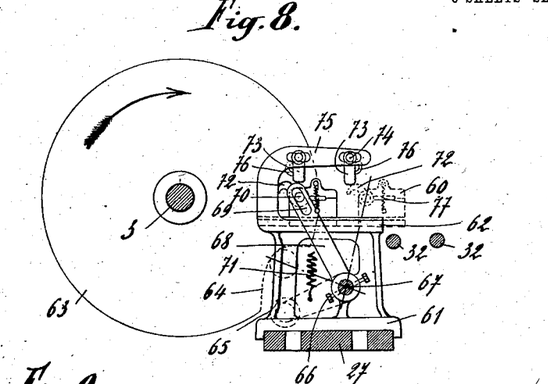
Fig. 8 is a section on the line E F of Fig. 1, showing the clips which seize the wire after it has been brought in front of the machine by the gripper represented in Figs. 4 and 5.

The wire brought in front of the machine in the manner hereinbefore described is seized by two nippers 60, Fig. 8, of similar construction to that of the gripper 15, hereinbefore described. The actuating mechanism of these nippers, as well as their operation, will be clearly understood by reference to Fig. 8. On the slotted table 27, as illustrated by these figures, are mounted two brackets 61, Figs. 1 and 8, each provided with a dovetailed guide 62, Fig. 1, arranged perpendicularly to the direction of the driving-shaft 3 of the machine. In these guides can slide the nippers 60. This movement is obtained in the following manner: In a suitable position on the shaft 3 is mounted a disk 63, Figs. 1 and 8, provided with a cut-away portion 64, into which can fall a roller 65, mounted on the end of the arm 66, keyed upon a shaft 67, arranged to oscillate in bearings 31, Fig. 3. This shaft carries on each side of the brackets 61 two levers 68, fixed to the said shaft and acting through the slot 69, Fig. 8, upon rods 70, fixed upon the brackets of the nippers 60. It will therefore be easily understood by reference to Fig. 8 that so long as the roller 65 is held against the circular surface of the disk 63 under the action of a suitable spring 71, Figs. 2 and 8, the levers 68 will keep the nippers 60 in the position represented in full lines in Fig. 8. Directly the roller 65 falls into the cut-away portion of the disk 63 the nippers are pushed forward and brought into the position represented by the dotted lines in Fig. 8; but at this moment the curved nose 72 of the movable jaw of the said nippers comes against a stop 73, turning freely in one direction upon a pivot 74, carried by an arm 75 on the bracket 61 and prevented from moving in the opposite direction by a fixed stop 76. The result is that the nipper will open directly it arrives in the vertical plane in which the wire 37 is located. This nipper will again close under the action of the spring 77 immediately it becomes free of the stop 73 and will consequently seize the wire; but at this moment the roller 65, rising over the curve of the cut-away portion 64 of the disk 63, will cause the lever 66 to move downward. The rocking of the shaft 67 will transmit this movement to the levers 68, which will bring back the nippers to the position represented in full lines in Fig. 8. Before the nippers 60 reach the end of their travel the nose 72 therefor encounters new stops 73, carried by the arm 75. These stops being also adapted to move only in one direction by reason of stops 76, with which they are combined, will cause the opening of the nippers 60 and the disengagement of the wire which is to be operated on in the machine.

I will now successively describe the various devices for operating on the wire and will afterward describe the whole operation and the manner in which the different devices coöperate in the manufacture of the heald. I would especially observe, however, that the wire brought along by the nippers 60, as has just been described, is carried along by the latter over small curved guides 78, Fig. 11, carried by disks or matrices 79, mounted upon brackets 80, which will be hereinafter described in detail. At the moment when the wire is released by the nippers 60 it rests in the recesses 81, Figs. 11 and 12, of the disks or matrices 79. The wire has then to be bent back at the two ends to form the end eyes or loops. This bending is effected by means of the mechanism represented in separate views at Figs. 9 and 10. This mechanism is carried by two supports 82, Figs. 1, 9, and 10, fixed upon the table 27. Each of these supports 82 has an upright plate 83, on which can vertically slide a plate 84, provided with a guide-slot 85, Fig. 10, in which is engaged a stud fixed upon the plate 83. The plate 84 is also provided with a stud 87, bearing against a flat spring 88, fixed to the support 82. The plate 84 can be lifted along the plate 83 by the end of a lever 89, oscillating at 90 upon the support 82, and carrying at its other end a roller 91, on which can act a cam 92, fixed upon the shaft 3 of the driving mechanism of the machine. The plate 84 has at its upper part a hook 93, Figs. 1 and 10, which corresponds with the plate 94, which I will suppose for the moment to be carried by a suitable fixed support. The ends of the wire when the latter is introduced into the recesses 81 of the matrices 79 are brought under the pin 94 and over the hook 93 by the downward movement of a lever 154, Figs. 11$^a$ and 11$^b$, which will be described hereinafter. When the cam 92 acts upon the roller 91 of the lever 89, the latter lifts the plate 84 at first vertically the whole length of the guide-slot 85, Figs. 10 and 10$^a$. The stud 86 having arrived at the lower end of the said slot and the lever 89 continuing to lift the plate 84 the latter is compelled to take the inclined position represented in dotted lines in Fig. 10 and in full lines in Fig. 10$^b$. By reason of this movement the hook 93, which has at first raised the end of the wire, Fig. 10$^a$, bends back the latter around the pin 94, Fig. 10$^b$, which thus forms one of the end eyes or loops. Directly the cam 92 leaves the roller 91, Fig. 9, the plate 84 is automatically brought back into the position represented in full lines in Fig. 10 under the action of the spring 88 acting on the stud 87. At the side of the supports 82 are mounted upon the plate or table 27 the brackets 80, which have already been described. These brackets 80, which carry the disks or matrices 79, in which rests the wire, also support punches 95, Figs. 1, 2, and 11, carried by rods 96, passing through guides 97. These rods 96 are kept constantly pressed downward by a spring 98, wound around each of the rods 96 and acting upon the said rod through the medium of a nut 99. Above the upper guide-rod 97 the rods 96 are each connected to an oscillating lever 100, which is carried by a pivot 101 on the upper end of each of the brackets 80. These levers 100 can be rocked at each rotation of the cam-shaft 3 by a suitable cam 102, acting on the end of each lever 100 through the medium of a roller 103 at the moment when the matrices 79 are disengaged to allow the introduction of the wire therein. On the trunnion of the roller 103 and on each side of the lever 100 are mounted two levers 154 and 155. The lever 154 has already been mentioned and is intended to bring the wire under the pin 94 when the wire has been placed in the matrix 79. Levers 154 and 155 are suitably curved, and their ends are connected by a spring 156. Lever 154 may be acted upon by a boss 157, provided on the bushing of the cam 102, and lever 155 may be acted upon by a boss 158, fixed to the cam 102 in such a manner as not to act upon lever 154, Fig. 11$^a$.

Figure 11B:
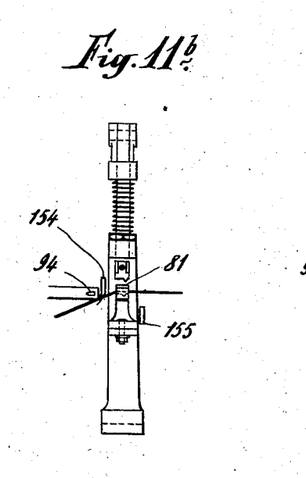
Figure 11C:
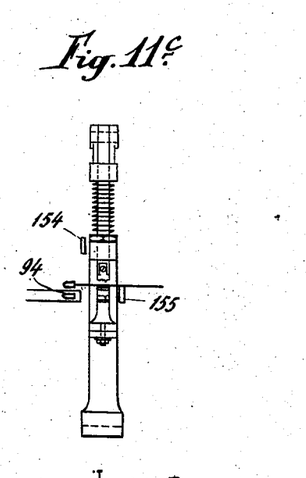
Figure 12:
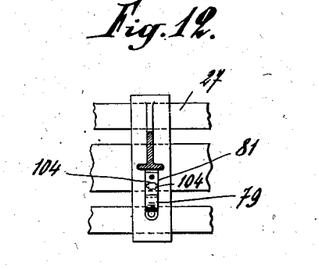
Fig. 12 is a plan view of the matrix serving to form the supplementary eye or loop in the mechanism represented in Fig. 11.

When the wire 37 has been placed in the manner described in the matrix 79, the pin 94 is withdrawn out of the vertical plane containing the wire, as will be explained further. At this moment the lever 154 is acted upon by the boss 157, and the wire 37 is brought, as already stated, by said lever under the pin 94, Fig. 11$^b$, which in the meantime has been returned in its normal position.

Figures 9, 10:
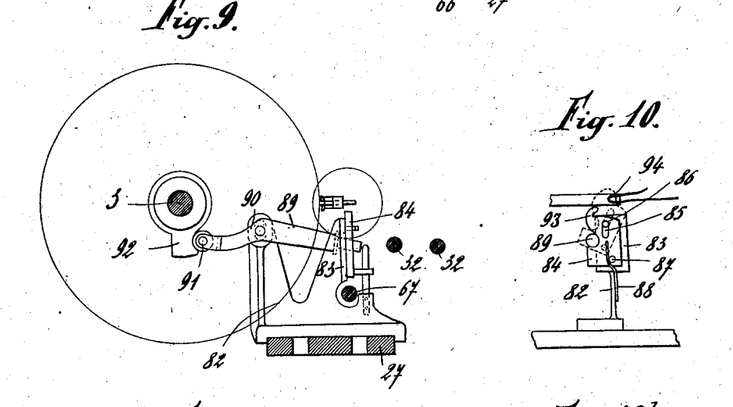
Fig. 9 is a section on the line G H, Fig. 2, showing the mechanism serving to actuate the hooks which bend down or fold back the ends of the wire to produce the end eyes or loops after the introduction of the heald into the machine by the clips represented in Fig. 1.
Fig. 10 is a view of a detail, showing separately the hook actuated by the mechanism represented in Fig. 9, the said hook being represented in the two positions it occupies during the bending back of the wire.
Figure 10A:
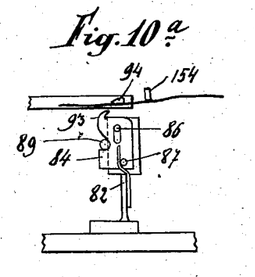
Figure 10B:
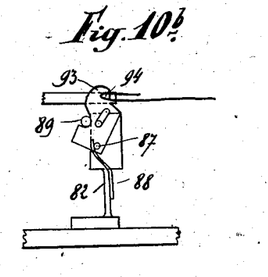

While the hooks 93, above described, Fig. 10, bend back the wire at each of its ends over the pin 94, the punches 95, provided with a point arranged between two flat parts, as shown in Fig. 1, remain still raised and separate from the matrices 79 under the action of the cams 102. As soon as the bending has been effected the roller 103 of each of the levers 100 leaves the cam 102 and the punches 95 fall into the matrices 79 under the action of the springs 98. The pointed parts of the punches engaging between the two wires constituting the double wire slightly open the said wires in the recesses 81 of the matrices 79. Simultaneously the flat part of these punches acting upon the ends of the backwardly-bent wire forces the said ends into the recess 81, the width of which is exactly equal to that of the four wires, which thus come into position at this point in the same plane, as shown more particularly in Figs. 19, 20, and 21. While this forcing of the bent ends of the wire into the supplementary loops formed by the punches 95 takes place, the wire remains held in the recesses 104 of the matrices 79, the width of which exactly corresponds, as already stated, with the width of the double wire. From this moment the wire, provided with the two end loops formed by the pins 94, remains held by the said pins and by the punches 95 pressed into the matrices 79 by the springs 98.

At the same time that the formation of the supplementary loops by the punches 95 and the forcing of the free ends of the said wire into the said loops are effected the middle loop is also formed. This formation is effected by the following means: Between the brackets 61, Fig. 1, is mounted a support 105, the two vertical arms 106 and 107 of which (see Figs. 1 and 13) each form at their upper part a fixed jaw 108, Fig. 13, against which acts a movable jaw 109, formed at the end of levers 110, which pivot at 111 upon pins fixed in the arms 106 and 107 of the support 105. These levers 110 can be kept with their movable jaws 109 pressed onto the fixed jaws 108 under the action of a cam 112, mounted upon the shaft 3. These cams 112 lift the ends 110 of the levers, so as to insure the wire being held between the jaws 108 and 109, as will be hereinafter explained. Between the arms 106 and 107 of the support 105 is mounted a second support 113, on which is a semicircular portion 114, in which can engage a gear-wheel 115, Figs. 1, 13, and 13$^a$, provided with two rings of teeth separated by a groove in which takes the semicircular portion 114 of the support 113. This semicircular portion 114 consequently serves as a support and at the same time as the bearing of this gear-wheel. The latter is held in this bearing by a cover 116, Figs. 1 and 13, following the contour of the upper half of the groove separating the two toothed rings 115 and fixed on the support 113 by a screw 117, Fig. 13. The gear-wheel 115 is hollowed out, so as to form a circular passage 118, into which the wire can be introduced when it is brought by the nippers 60 through a slot 119 made in the gear-wheel and between the ring 114 of the support 113 and the front part of the cover 116, Figs. 13 and 13$^a$. The two toothed rings 115 can be rotated by a spur-wheel 120, also mounted on the driving-shaft 3 of the machine and provided on one portion of its circumference with a number of teeth sufficient to cause the double-toothed ring 115 to make, for example, three revolutions, when the teeth of the said double ring are engaged with the teeth of the spur-wheel 120.

Figure 13:
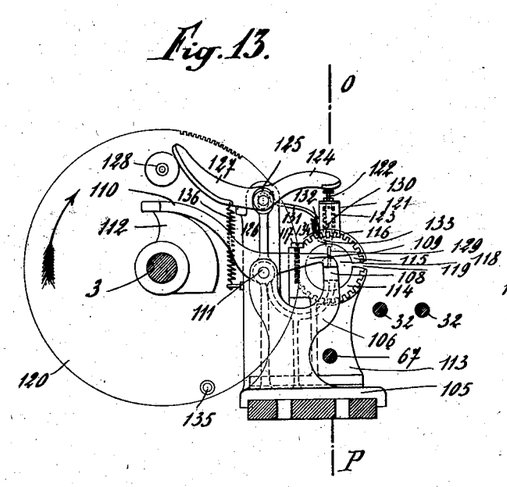
Fig. 13 is a vertical section on the line K L of Fig. 1, the said figure showing the mechanism serving to form the middle eye or loop, the punch for producing the said eye or loop, and the means for causing the said punch to turn so as to twist the wire on each side of the middle loop.
Figure 13A:
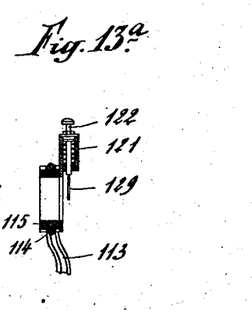
Figure 13B:
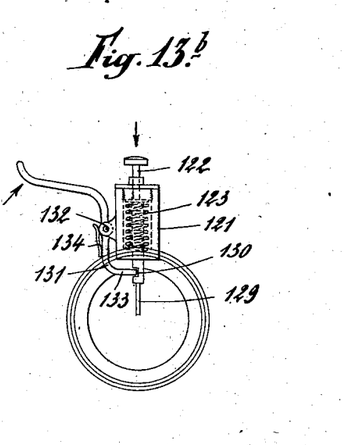
Figure 14:
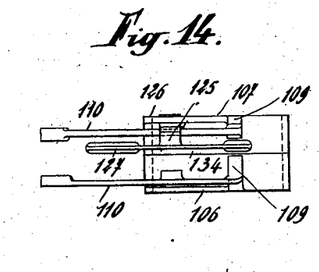
Fig. 14 is a detail view showing in plan the levers acting, in conjunction with the mechanism represented in Fig. 13, for holding the wire while the twist is being produced on each side of the middle loop.
Figure 15:
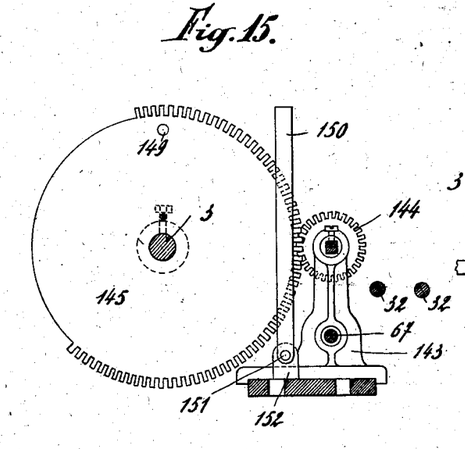
Fig. 15 is a vertical section on the line M N, Fig. 2, the said figure showing the mechanism serving to produce the twist at the two ends of the heald between the end loops and the supplementary loops, in which are located the ends of the backward-bent wire.
Figure 16:
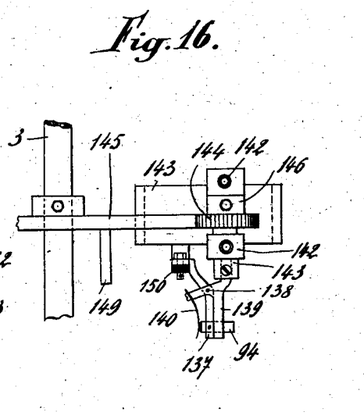
Fig. 16 is a plan of the said mechanism, showing the manner in which it acts upon the pins serving to form the end loops or eyes in order to disengage the heald from the said pins after the twist has been effected.
Figure 20:
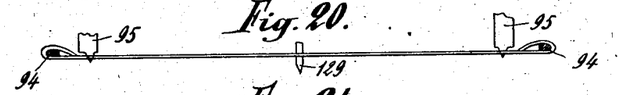
Fig. 20 is a longitudinal view corresponding to Fig. 19 and illustrating the manner in which the punches force asunder and hold the ends of the double wire in the supplementary loops while forming the latter.
Figure 21:
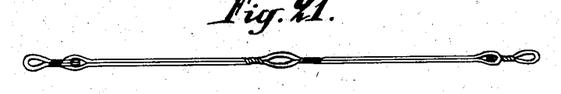
Fig. 21 is a longitudinal view of the finished heald.

The annular gearing 115 is provided at one side and outside the cap or cover with a vertical support carrying a tubular part 121, represented in section at Fig. 1, and in which is located a rod 122, Fig. 13$^b$, subjected to the action of the spring 123, which tends to keep it raised. This rod 122 carries the punch 129, designed to force asunder the two wires constituting the double wire of the heald, for forming the middle loop. To this end the said rod 122 can be lowered under the action of a lever 124, pivoting at 125 on the end of a vertical arm 126, forming part of the support 105. This lowering of the rod 122 is effected when the curved end 127 of the lever 124 is raised by a roller 128, fixed on one of the sides of the double gear-wheel 120. When this roller 128 acts upon the said end 127 of the lever 124 and lowers the rod 122, and consequently the punch 129, carried by the said rod, the rod 122 compresses the spring 123 in the tubular portion 121. When the rod 122 reaches the lower end of its travel, and consequently the punch 129 has been forced between the two wires to divide them and form the middle loop, a notch 130 (shown more clearly in Fig. 13$^b$) made in the rod 122 comes opposite the end of the lever 131, Figs. 13 and 13$^b$, mounted on the side of the tubular portion 121 upon a pivot 132, so that it can rock upon the said pivot and its end 133 can fall into the said notch 130 under the action of a spring 134. The result is that when the rod 122 is lowered and the punch 129 has passed between the wires of the heald to form the middle loop the said rod 122 is held in its lowered position as long as the end 133 of the rod 131 remains engaged in the notch 130 of the rod 122 under the action of the spring 134. The lowered position of the rod 122 is maintained until the moment when by reason of the rotation of the double gear-wheel 120 a roller 135, carried by the said gear-wheel, meets the free end of the lever 131 and causes it to rock upon its pivot 132 against the action of the spring 134. Through this rocking of the lever 131 the end 133 of the said lever becomes disengaged from the notch 130 of the rod 122, which can then rise again under the action of the spring 123 and withdraw the punch 129 from the middle loop of the heald which the said punch has formed when being lowered. At this time, of course, the lever 124 has been for a long time free from the action of the roller 128 and has been brought back into its former position under the action of the spring 136, Fig. 13; but between the time when the roller 128 has acted upon the curved end 127 of the lever 124 to lower the rod 122 and that when the roller 135 comes to act upon the lever 131 to free its end 133 from the notch 130 of the rod 122 to allow the return of the said rod to its raised position the toothed part of the gear-wheel 120 has engaged the two toothed rings of the gear-wheel 115 and has caused the said gear-wheel to perform two or three complete revolutions, (by preference three.) Consequent upon the said revolution the tubular part 121, carrying the rod 122, which at this time was in its lowered position, has performed the same number of rotations, so that the punch 129, engaged between the two wires constituting the double wire of the heald, Fig. 20, has twisted the said wire so as to produce three convolutions or twists, as shown in Fig. 21, on each side of the middle loop, the wire being held during this twisting operation between the jaws 108 and 109 of the vertical arms 106 and 107 of the support 105 on each side of the gear-wheel 115. When the roller 135 meets the lever 131 to free the end 133 of the said lever from the notch 130 of the rod 122, the heald is consequently finished at its central part, the loop being formed and the twist having been given to it on each side of the loop. At this moment the heald is really finished, seeing that the twist has been simultaneously effected at both ends between the end loops formed by the pins 94 and the place where the wire is held in the manner already described in the recesses 81 and 104 of the matrices 79. These end twists have been effected in the following manner: The pins 94 hereinbefore mentioned and over which the ends of the wire 37 have been bent are mounted as shown particularly in Fig. 16. These pins are carried by an arm 137, pivoted at 138 on a second arm 139, through which passes the pin 94, held in its normal position under the action of a spring 140, fixed to the arm 139, as clearly shown in Fig. 16. Each arm 139 is fixed at the end of a shaft 141, which can turn in the arms 142 of a bracket 143, mounted on the slotted table 27. This shaft 141 carries between the arms 142 a pinion 144, Figs. 1, 15, and 16, arranged to be rotated by a wheel 145, provided with teeth on only a portion of its circumference, so as to cause the pinion 144 to perform a number of revolutions corresponding to that which the gear-wheel 120, Fig. 13, causes the hereinbefore-described double gear-wheel 115 to make. Owing to this arrangement at the moment when after the formation of the middle loop the rotation of the punch 129, with the gear-wheel 115, effects the twist on each side of the middle loop the two pinions 144 are also rotated and turn the pins 94, which thus twist the wire between the loops formed by the said pins and the supplementary loops—that is to say, at the place where the punches 95 hold the wire in the matrices 79; but as by reason of this twisting the length of the heald is slightly decreased the pins 94 must be capable of moving longitudinally—that is to say, of approaching one another—and this result is obtained by the longitudinal movement of the shafts 141 in their arms 142, the gear-wheel 144 having for this purpose a certain lateral play between a stop 146 and one of the arms 142, Figs. 1 and 16. In order to bring back the gear-wheels 144, and consequently the shafts 141 and pins 94 into their former position after the twisting has been effected, the shafts 141 are subjected to the action of a spring 147, Fig. 1, bearing against the arm 142 and acting upon the shafts 141 through the medium of collars and nuts 148, mounted on the ends of the said shafts. When the twisting has been effected at the ends, as well as at the middle of the healds, the latter must be disengaged from the machine. For this purpose it is first disengaged from the punch 129 in the manner already described, the latter being withdrawn from the loop at the moment the raising of the rod 122 takes place. Simultaneously a stop 149, carried by the toothed wheels 145, meets a vertical lever 150, Figs. 1, 15, and 16, pivoting at 151 upon a suitable support 152. By reason of this action of the stop 149 upon the vertical lever 150 the latter is caused to press, as shown in Fig. 16, upon the movable arm 137 of the support of each of the pins 94. This movable arm 137 consequently pivots at 138 against the action of the spring 140 and withdraws the pin 94 from the end loop of the heald in which it was engaged. The heald is therefore quite finished at this moment and rests free in the matrices 79, carried by the columns or supports 80. It is then lifted out of the matrices 79 by the action of lever 155, Figs. 11$^a$ and 11$^c$, which is acted upon by the boss 158, provided on the cam 102, and is thrown outside the machine by the nippers 60, which again advance, ready at this moment to seize a fresh wire which has been brought in front of the machine by the wire-gripper 15, already described.

From the detailed explanation hereinbefore given regarding the separate function of each part of the machine it will be easy to form a general idea of the complete operation and the different stages of the work by referring especially to Figs. 17 to 21.

Figure 17:
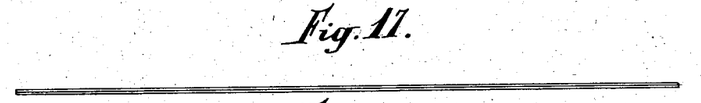
Fig. 17 is a separate view of the two wires soldered together and cut to the proper length for introduction into the machine.
Figure 18:
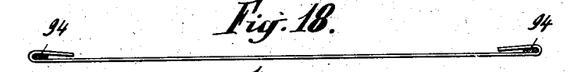
Fig. 18 is a longitudinal view of the double wire, having the ends bent over the pins for forming the end eyes or loops.
Figure 19:
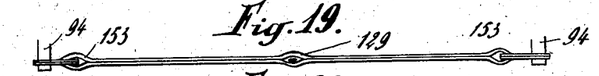
Fig. 19 is a plan view of the double wire, the ends of which are bent back over the pins for forming the end eyes or loops at the same time that the middle eye or loop is formed.

The machine being in operation during the last period of the manufacture of a heald—that is to say, while the twist is being given by the rotation of the gear-wheels 144 and the central gearing 115—the wire-gripper 15 has performed its backward travel in the manner described at the commencement of this description and has proceeded to secure the wire as it issues from the hole 43 in the cutter-carrying plate 42 by slightly pushing back the said plate, as hereinbefore described, to seize the wire between the jaws 53 and 55 and bring it in front of the machine. Directly it arrives at the end of its forward travel and the crank 12 comes to rest upon the stop 23 the nippers 60 advance under the action of the levers 68 and seize the wire while the knife 46 cuts it to the required length and the gripper 15 disengages the wire from the jaws 53 and 55. The nippers are afterward withdrawn perpendicularly to the direction in which the wire has been brought and conduct it into the recesses 81 of the matrices 79, access to which is assisted by the curved surfaces 78, Fig. 11. The wire then in plan view appears as represented in Fig. 17. At this moment the pins 94, which have just been disengaged from the loops of the heald previously manufactured, are withdrawn, as has been explained. The levers 154 are lowered, Fig. 11ª, and the wire is brought under the said pins and over the hooks 93. The pins 94 return to their normal position, and the plates 84 rise, turn down the wire over the fixed pins 94, and give it the appearance represented in Fig. 18. This operation having been completed, the punches 95 fall abruptly into the matrices 79 at the same time that the punch 129 engages at the middle between the two edges of the double wire, and the movable jaws 109 grip the wire between themselves and the fixed jaws 108. Through the lowering of the punches 95 the ends of the wire are bent down, as shown in Figs. 19 and 20, into the supplementary loops 153, Fig. 19, in which they are located in the same plane as the two wires constituting the heald. Immediately after the lowering of the three punches the gear-wheels 144 and the central gear-wheel 115 commence to revolve and effect the twist. The heald is then freed by reason of the lifting of the punches under the action of the springs 98 and 123 and of the withdrawal of the pins 94 out of the end loops. At this moment the heald is lifted out of the matrices 79 by the levers 155. The heald being then of the shape represented in Fig. 21 is pushed outside the machine by the nippers 60 advancing to seize a fresh wire. As the heald leaves the machine it is again disengaged from the central aperture 118 in the middle gear-wheel 115 by passing through the slot 119, made in the said gear-wheel and its cap or cover 116. The finished heald is afterward introduced into a machine to be soldered, if required.

The particular advantages connected with the feeding of the wire in front of the machine before its introduction into the working parts in a machine of this kind will be easily understood. This arrangement allows more especially of considerably increasing the product of the machine compared with that of machines as hitherto constructed, which only partially carry out the mechanical manufacture of the healds and in which the wire is directly brought into position to be operated on. In fact, the present arrangement allows the machine to be fed while the preceding heald is still in the course of manufacture, so that the operation of disengaging the finished heald can be simultaneously utilized for the introduction of a new length of wire to be operated on.

In the example hereinbefore described the different supports of the working parts (61, 80, 143, 82, 105, and 113) are mounted in slots 28 in the table 27, so as to allow of placing without difficulty each of the supports exactly in the position which it should occupy according to the length of the heald to be made. Similarly the travel of the wire-gripper 15 can be regulated as required by means of the extensible rod 14 and the slot 13 made in the crank 12.

Having thus described my invention, what I claim is—

1. In a heald-making machine, the combination of a heald-forming mechanism, with a feeding device comprising a wire-holder having a to-and-fro movement in front of the machine, means for cutting a length of wire in front of the machine, and nippers adapted to move transversely and to bring the length of wire into the machine, substantially as described.

2. In a heald-making machine, the combination with a heald-forming mechanism, of a feeding device comprising a wire-holder having a to-and-fro movement in front of the machine, a wire-guide adapted to prevent any formation of kinks in the wire as it unwinds, means for cutting a length of wire in front of the machine, and nippers adapted to move transversely and to bring the length of wire into the heald-forming mechanism, substantially as described.

3. In a heald-making machine the combination of a feeding device comprising a wire-holder having a to-and-fro movement in front of the machine and nippers adapted to move transversely, a heald-forming mechanism and a mechanism forming supplementary loops near the ends of the heald and bending the ends of the wire into the said supplementary loops, substantially as described.

4. In a heald-making machine the combination of a feeding device, a heald-forming mechanism and a mechanism forming supplementary loops near the ends of the heald and bending the ends of the wire into the said supplementary loops substantially as described.

5. In a heald-making machine the combination of a feeding device and a heald-forming mechanism comprising means for holding a length of wire between the heald-forming mechanism, devices for bending back the two ends of the wire in order to form the end loops, a device for forming a central loop in the wire, mechanisms adapted to rotate the devices for bending back the ends of the wire and the central loop-forming device in order to twist the wire near the loops and a mechanism forming supplementary loops between the end and central loops and forcing the ends of the wire into the said supplementary loops substantially as described.

6. In a heald-making machine the combination of a feeding device bringing the wire in front of the machine, a cutting mechanism cutting a length of wire in front of the machine, devices adapted to move transversely and introducing the length of wire between the heald-forming mechanism, devices for bending back the ends of the wire to form end loops, a device for forming a loop in the middle of the length of wire, actuating devices adapted to rotate the loop-forming devices in order to twist the wire near the loops and a mechanism forming supplementary loops between the end and central loops and forcing the ends of the wire into the said supplementary loops substantially as described.

7. In a heald-making machine in combination with a heald-forming mechanism guide-rods extending the whole length of the machine in front thereof, a wire-holder having a to-and-fro movement upon said rods and comprising a fixed and a movable jaw, means for moving the same wire-holder upon the guide-rods, and stopping the said movement at the end of the forward travel of the wire-holder, a stop acting on the movable jaw of the wire-holder at the end of its backward travel in order to allow the nipping of a wire between the jaws, a stop acting on the movable jaw of the wire-holder at the end of its forward travel in order to deliver the wire, a cutting mechanism mounted upon the guide-rods and cutting a length of wire at the moment the wire-holder is at the end of its forward travel and nippers seizing the wire when brought in front of the machine by the wire-holder and bringing it into position in the heald-forming mechanism substantially as described.

8. In a heald-making machine in combination with a heald-forming mechanism guide-rods extending the whole length of the machine in front thereof a wire-holder having a to-and-fro movement upon said rods, an extensible rod connected to said wire-holder, a crank actuating said extensible rod, a small shaft upon which said crank is keyed, a bevel-pinion mounted on the said shaft a bevel gear-wheel provided with teeth upon only a portion of its circumference and actuating the bevel-pinion of the crank-shaft means for rotating the said bevel gear-wheel, a stop supporting the crank at each revolution during the time that the bevel-pinion is out of engagement with the toothed part of the bevel gear-wheel, means for releasing the said stop directly the teeth of the gear-wheel become engaged with the crank-actuating pinion and devices adapted to take the wire in front of the machine from the wire-holder and to bring it in the heald-forming mechanism substantially as described.

9. In a heald-making machine the combination of a heald-forming mechanism guide-rods extending the whole length of the machine in front thereof, a wire-holder having a to-and-fro movement upon said rods means for actuating said wire-holder, a bracket mounted on the guide-rods, a piece of elastic material adapted to rotate freely in said bracket, said piece of elastic material being provided with a hole through which the wire passes with friction a plate mounted on the guide-rod near the wire-guide and provided with a small hole in which the wire passes after it has passed through the elastic piece, a rocking knife mounted on said plate and adapted to cut the wire, an actuating mechanism for said knife and means for holding the wire when it has been cut by said knife and bringing it in the heald-forming mechanism, substantially as described.

10. In a heald-making machine the combination of a feeding device comprising a wire-holder having a to-and-fro movement in front of the machine means for actuating said wire-holder a cutting-knife for cutting a length of wire in front of the machine, movable nippers adapted to seize the said length of wire in front of the machine and moving transversely to the length of the machine, actuating mechanism for the said nippers and a heald-forming mechanism to which the wire is delivered by the said nippers substantially as described.

11. In a heald-making machine the combination of a feeding device placed in front of the machine, nippers receiving the wire from said feeding device and moving transversely to the length of the machine, brackets 80 provided with a mechanism for forming supplementary loops, matrices 79 carried by said brackets and in which the wire rests during the forming of the heald, curved guides 78 carried by the matrices 79 and adapted to facilitate the bringing of the wire into the matrices 79 and a heald-forming mechanism substantially as described.

12. In a heald-making machine the combination of a feeding device means for bringing a wire from the feeding device into the heald-forming mechanism and a heald-forming mechanism comprising a punch 129 adapted to rotate on its support in order to form a central loop and twist the wire at both sides of said loop, pins 94 carried on shafts 141 adapted to rotate in suitable bearings, and hooks 93 adapted to bend the ends of a wire back over said pins 94 in order to form the end loops of the heald, substantially as described.

13. In a heald-making machine the combination of the mechanism for making the end loops of the heald comprising two supports 82 each provided with an upright plate 83 plates 84 sliding vertically on said plates 83 and each provided with a guide-slot 85 a stud 86 fixed upon each plate 83 and engaged in said slot 85 a stud 87 on each plate 84 a flat spring 88 fixed to the support 82 and bearing against the stud 87 an actuating mechanism adapted to lift the plate 84 a hook 93 provided at the upper part of each plate 84 and a pin 94 rotatably mounted in suitable bearings over which each end of the wire is bent by the hook 93 when the plate 84 is lifted by the actuating mechanism, substantially as described.

14. In a heald-making machine the combination of the mechanism for making the middle loop comprising a support 105 two vertical arms 106 and 107 a fixed jaw 108 at the upper part of each of the said arms 106 107 movable jaws 109 adapted to be pressed upon the fixed jaws 108 an actuating mechanism for the said movable jaws a support 113 mounted between the arms 106 107 a gear-wheel 115 mounted on said support said gear-wheel being hollowed out so as to form a circular passage 118 and provided with a slot 119 means for rotating said gear-wheel, a tubular part 121 carried by the gear-wheel, a spring-pressed rod 122 located in the tubular part 121 a lever 124 adapted to press the said rod down, a punch 129 carried by the said rod and means for holding the said rod in its lowered position during the rotation of the punch, substantially as described.

15. In a heald-making machine, the combination of a frame 1, brackets mounted on said frame, a driving-shaft 3 rotating in said brackets, means actuating said shaft, two guide-rods 32 mounted in front of said shaft brackets 31 supporting said guide-rods, a feeding device moving to and fro upon the said guide-rods, nippers 60 moving transversely to the direction of the driving-shaft 3, brackets 61 supporting the said nippers and provided with dovetailed guides 62, a mechanism actuating said nippers, the said mechanism being acted upon from the driving-shaft 3, a support 105 mounted on the frame, fixed jaws 108 formed at the upper part of the said support 105, movable jaws 109 pressed onto the fixed jaws 108, a mechanism for actuating said movable jaws, the said mechanism being acted upon from the driving-shaft 3, a device for forming a central loop in the heald and twisting the heald at the sides of said loop, said device being actuated from the driving-shaft 3, devices for bending back the ends of the heald-wire in order to form end loops, a mechanism actuating said devices from the driving-shaft, two supports 80 mounted on the frame 1, matrices 79 carried by said supports, punches 95 mounted on said supports 80 and adapted to form supplementary loops in the heald and to force the ends of the heald-wire into the said supplementary loops, means for actuating the said punches 95, the said means being actuated from the driving-shaft 3, and levers 155 for delivering the heald out of the matrices 79, substantially as described.

In witness whereof I have hereunto set my hand in presence of two witnesses.

JEAN GOHY.

Witnesses:
GREGORY PHELAN,
MAURICE GERBEAULT.